(12) United States Patent
Kiyota

(10) Patent No.: US 9,191,636 B2
(45) Date of Patent: Nov. 17, 2015

(54) SOLID-STATE IMAGING DEVICE HAVING VARYING PIXEL EXPOSURE TIMES

(71) Applicant: KABUSHIKI KAISHA TOSHIBA, Tokyo (JP)

(72) Inventor: Yukinobu Kiyota, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 86 days.

(21) Appl. No.: 14/015,970

(22) Filed: Aug. 30, 2013

(65) Prior Publication Data

US 2014/0253766 A1 Sep. 11, 2014

(30) Foreign Application Priority Data

Mar. 8, 2013 (JP) ................................ 2013-046463

(51) Int. Cl.
*H04N 9/04* (2006.01)
*H04N 5/355* (2011.01)
*H04N 5/376* (2011.01)
*H04N 9/07* (2006.01)

(52) U.S. Cl.
CPC ........... *H04N 9/045* (2013.01); *H04N 5/35563* (2013.01); *H04N 5/376* (2013.01); *H04N 9/07* (2013.01)

(58) Field of Classification Search
CPC ....... H04N 9/045; H04N 5/335; H04N 5/369; H04N 9/07
See application file for complete search history.

(56) References Cited

U.S. PATENT DOCUMENTS

| 2002/0085672 A1* | 7/2002 | Ganin et al. ................ 378/108 |
| 2004/0017487 A1* | 1/2004 | Ueda .......................... 348/222.1 |
| 2006/0192867 A1 | 8/2006 | Yosefin |
| 2008/0211943 A1* | 9/2008 | Egawa et al. ................. 348/294 |
| 2009/0195683 A1* | 8/2009 | Honda et al. ................. 348/308 |
| 2011/0317058 A1* | 12/2011 | Narusawa et al. ........... 348/336 |

FOREIGN PATENT DOCUMENTS

| JP | S61255192 A | 11/1986 |
| JP | H11224941 A | 8/1999 |
| JP | 2001268441 A | 9/2001 |
| JP | 2005-80190 | 3/2005 |
| JP | 2006-121151 | 5/2006 |
| JP | 2007208885 A | 8/2007 |
| JP | 2010183357 A | 8/2010 |
| JP | 2012-118538 | 6/2012 |
| JP | 2012222533 A | 11/2012 |

OTHER PUBLICATIONS

Japanese Office Action dated Jun. 16, 2015, filed in Japanese counterpart Application No. 2013-046463, 12 pages (with translation).

* cited by examiner

*Primary Examiner* — Luong T Nguyen

(74) *Attorney, Agent, or Firm* — Patterson & Sheridan, LLP

(57) ABSTRACT

A solid-state imaging device includes an imaging region in which unit pixels which are obtained by arranging color filters in a photodiode are two-dimensionally arranged in matrix, and readout signal lines which are provided in plural with respect to an arbitrary one row at which the plurality of unit pixels are arranged, in which the readout signal lines are provided according to the number of color types of the plurality of unit pixels which are arranged at the one arbitrary row, and the same readout signal lines are connected to unit pixels of which color of color filters are the same, in the plurality of unit pixels which are arranged on the one arbitrary row.

15 Claims, 3 Drawing Sheets

SOLID-STATE IMAGING DEVICE HAVING VARYING PIXEL EXPOSURE TIMES

CROSS-REFERENCE TO RELATED APPLICATION

This application is based upon and claims the benefit of priority from Japanese Patent Application No. 2013-046463, filed Mar. 8, 2013, the entire contents of which are incorporated herein by reference.

FIELD

Embodiments described herein relate to a solid-state imaging device.

BACKGROUND

In recent years, the pixel size of solid-state imaging devices, which are used in a digital cameras or the like, has decreased to a range of approximately 1 µm in size. As pixel size shrinks, maintaining and/or improving image quality becomes very important. Since the amount of signal received by a photodiode type of a light receiving unit is reduced when the pixel size is reduced, improving the Signal to Noise Ratio (SNR) performance of a solid-state imaging device is a very important.

Since there are sensitivity differences between the three R, G, and B color filters used in an image sensor, when imaging an image, there is a case in which, for example, an imaged image is not viewed as a white image, and so-called coloring occurs, even when an object is actually white. In order to correct the coloring phenomenon, a White Balance (WB) function is provided in an imaging device. In general, in the WB, it is possible to improve the white balance by eliminating the difference in sensitivity between the R, G and B filters, by digitalizing signals which are obtained from the respective three color filters, and multiplying the digital signals by a gain corresponding to a sensitivity ratio between the filters. However, these types of WB corrections commonly used in the prior art leads to problems, since the amount of noise also increases when multiplying the signal by the gain, and thus the SNR of the device deteriorates as a result. The deterioration of the SNR is created, since it is not possible to isolate the noise component which is included in the signal.

Therefore, there is a need for a solid-state imaging device, and method of forming the same, that is able to reliably and accurately account for the variations in image signal received due to the variations in the color filter sensitivity, and improve its overall SNR performance.

DETAILED DESCRIPTION

Embodiments provide a solid-state imaging device that can suppress a deterioration in SNR of a digitized image signal detected by the device.

A solid-state imaging device according to an embodiment includes an imaging unit in which pixels, which are two-dimensionally arranged in a matrix of a photoelectric conversion element, and a readout signal line, which is provided with respect to one arbitrary row at which the plurality of pixels are arranged. In one configuration, color filters are each aligned with the pixels formed in the photoelectric conversion elements. In general, the readout signal line controls the delivery of charges accumulated by the photoelectric conversion element. The number of readout signal lines that are provided depends on the number of color types of the color filters, which are arranged in the plurality of pixels arranged at the arbitrary one row, and the readout signal line, which is common, is connected to each of the color filters in the plurality of pixels which are arranged at the arbitrary one row.

Hereinafter, embodiments will be described with reference to drawings.

Figure 1:
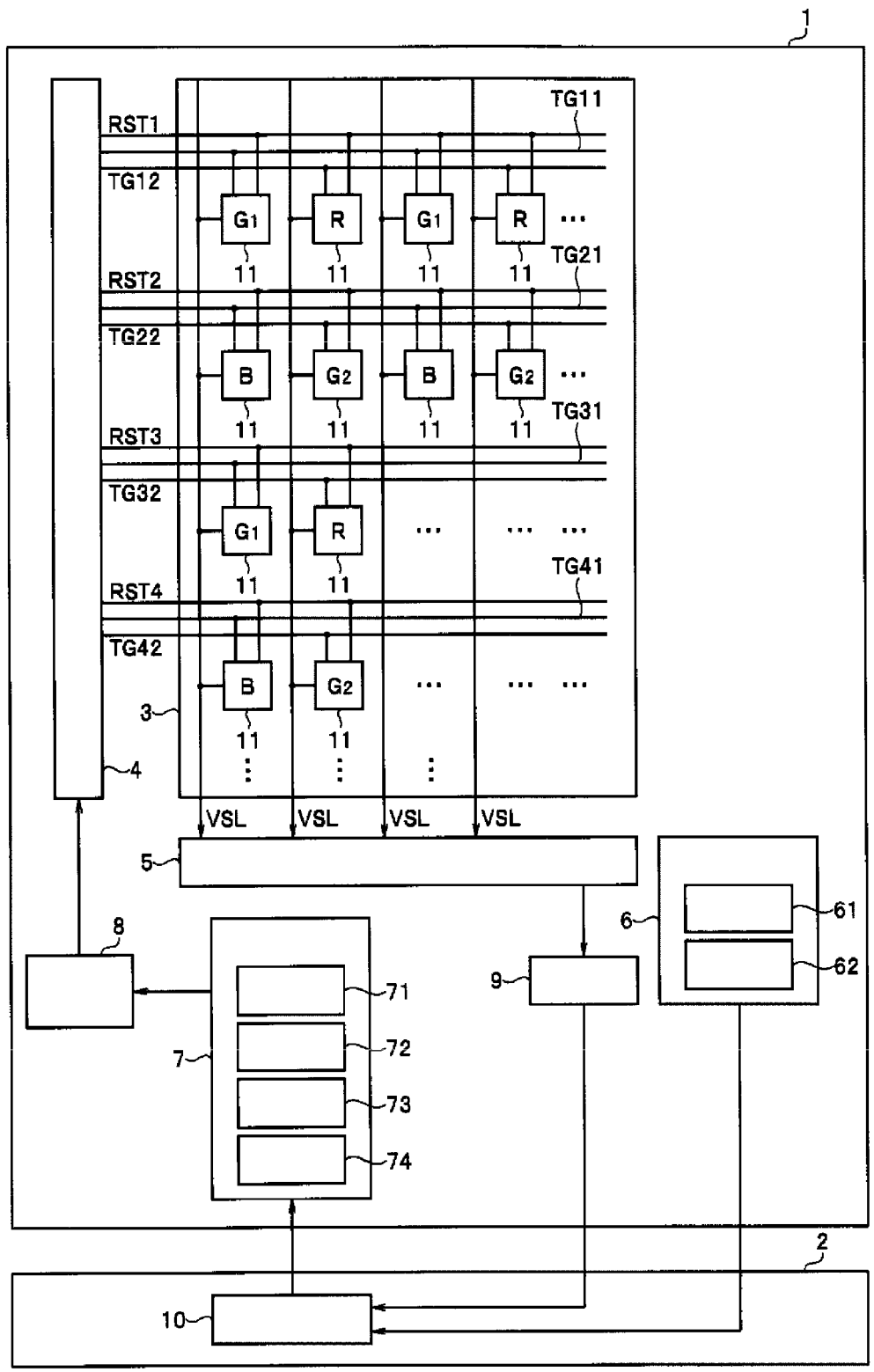
FIG. 1 is a block diagram which illustrates a configuration of a solid-state imaging device according to an embodiment of the invention.

FIG. 1 is a block diagram which describes an example of a configuration of a solid-state imaging device according to an embodiment. The solid-state imaging device according to an embodiment includes an image sensor unit 1, and an Image Signal Processor (ISP) unit 2.

The image sensor unit 1 includes an imaging region 3 in which a plurality of unit pixels 11 are two-dimensionally arranged in a matrix pattern in the row and column directions, a vertical shift register 4 as a selection unit which selects the unit pixel 11 in each row, and an AD conversion unit 5 which digitalizes an analog signal which is output from the unit pixel 11. In the respective unit pixels 11, a color filter is arranged in order to obtain a specified color signal. In the unit pixel 11 which is illustrated in FIG. 1, a pixel which is denoted by R is a pixel in which a color filter which mainly transmits light in a red wavelength range is arranged, and a pixel which is denoted by B is a pixel in which a color filter which mainly transmits light in a blue wavelength range is arranged. In addition, a pixel which is denoted by G (e.g., G1, G2) is a pixel in which a color filter which mainly transmits light in a green wavelength range is arranged.

In addition, the example in FIG. 1 illustrates a case in which color filters which are generally used as a Bayer arrangement are arranged. That is, the color filters are arranged so that color signals which are different from each other are obtained in the row direction and the column direction from a neighboring unit pixel 11.

In addition, the image sensor unit 1 includes a memory 6 for storing a sensitivity ratio of the unit pixel 11 in which an R color filter is arranged (hereinafter, denoted by R pixel), the unit pixel 11 in which a B color filter is arranged (hereinafter, denoted by B pixel), and the unit pixel 11 in which a G color filter is arranged (hereinafter, denoted by G pixel). The memory 6 may include a memory element for a sensitivity ratio between R and G 61 which stores a sensitivity ratio between the R pixel and the G pixel and a memory element for a sensitivity ratio between B and G 62 which stores a sensitivity ratio between the B pixel and the G pixel.

In addition, the image sensor unit 1 includes an exposure time control unit 7 which controls an exposure time of the unit pixel 11. In the solid-state imaging device according to one embodiment, the exposure time can be set in each color filter which is arranged in the unit pixel 11. Accordingly, the exposure time control unit 7 includes a G1 register 71 and a G2 register 74, which each set an exposure time of the G pixels, an R register 72, which sets an exposure time of the R pixel, and a B register 73, which sets an exposure time of the B pixel. In addition, in FIG. 1, two registers of the G1 register 71 and the G2 register 74 are set as registers for setting the exposure time of the G pixel, however, there may be a configuration in which only one register is included as the G register. In addition, it is not necessary to set a register in each color pixel, and a register of a plurality of colors may be set in common. For example, when exposure times of the R pixel and the B pixel are the same, it is possible to set them with one register.

In addition, the image sensor unit 1 also includes a timing generator 8, which generates a predetermined clock signal which is necessary when operating each of the unit pixels 11 according to the settings generated by the exposure time control unit 7, and an output interface 9 for outputting a pixel signal, which is derived from a signal which is output from the unit pixel 11.

The ISP unit 2 includes an Auto Luminous Control (ALC) 10 which controls brightness of an image signal. The ALC 10 calculates an optimal exposure time in each color pixel based on a sensitivity ratio between each of color pixels which is stored in the memory 6, and a level of a pixel signal which is output from the unit pixel 11. The ALC 10 calculates and then outputs the desired exposure time to the exposure time control unit 7.

In addition, in FIG. 1, only a part of the unit pixels 11, which are arranged in the imaging region 3, is illustrated. In practice, dozens of rows to several thousands of rows are arranged in the imaging region 3, and dozens of units to several thousands of units of the unit pixels 11 are arranged in each row and each column.

Figure 2:
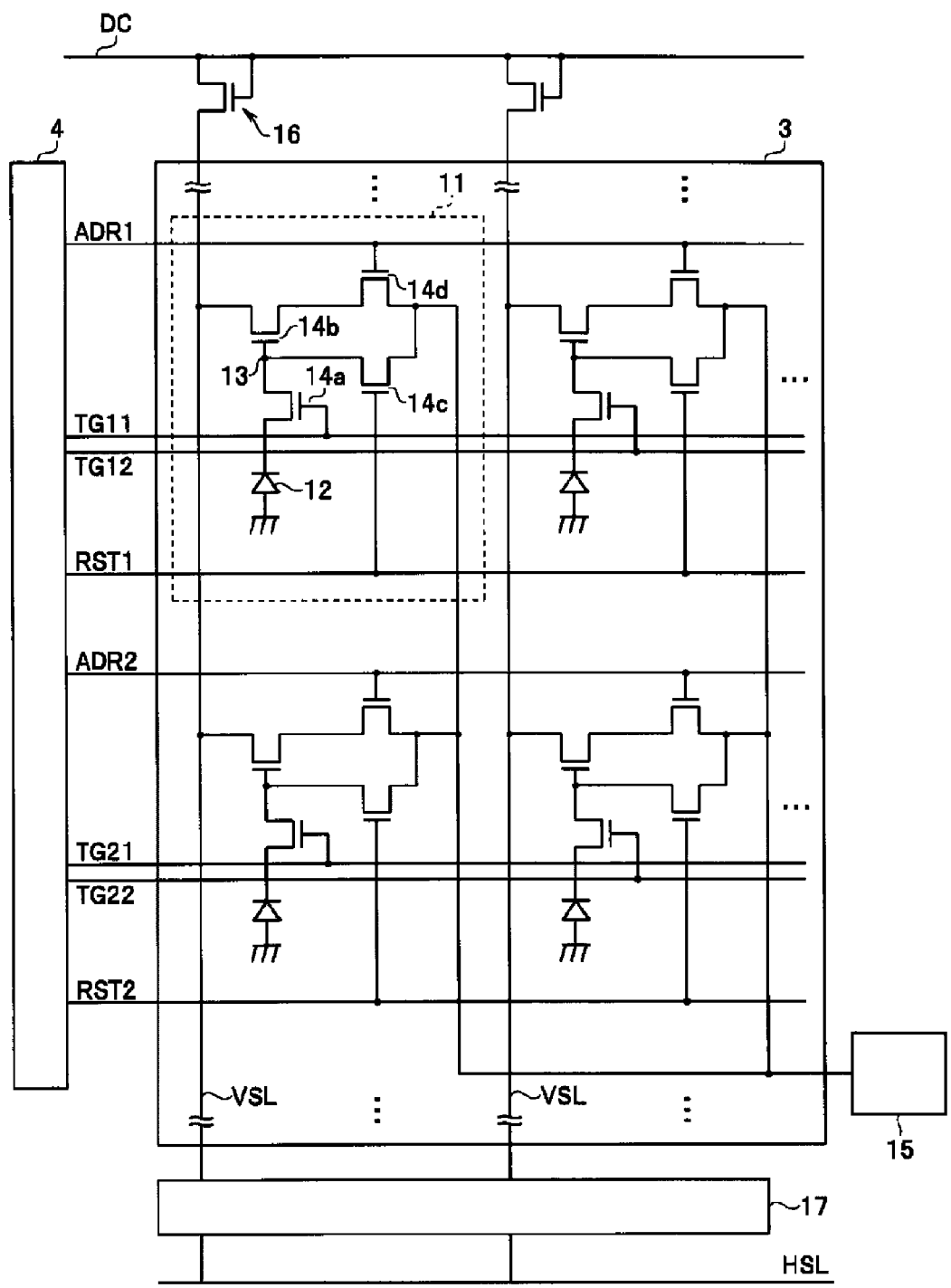
FIG. 2 is a diagram which illustrates a circuit configuration of a unit pixel according to an embodiment.

Subsequently, a circuit configuration of a unit pixel 11, which is illustrated in FIG. 1, will be described using FIG. 2. FIG. 2 is a diagram which describes an example of a circuit configuration of the unit pixel 11 relating to an embodiment. As illustrated in FIG. 2, the unit pixel 11 is arranged at a crossing position of a readout signal line TG and a vertical signal line VSL from the vertical shift register 4 in the imaging region 3. The unit pixel 11 is configured by, for example, a photodiode 12 as a light receiving element (photoelectric conversion element), which outputs a signal corresponding to an input light amount, and four transistors of a readout transistor 14a, an amplification transistor 14b, a reset transistor 14c, and an address transistor 14d. The configuration of the unit pixel 11 is an example, and is not intended to be limited to the embodiment described herein.

A cathode of the photodiode 12 is grounded, and an anode is connected to a floating diffusion layer 13 through the readout transistor 14a. In the amplification transistor 14b, a gate is connected to the floating diffusion layer 13, one end of a current path is connected to the vertical signal line VSL, and the other end is connected to an end of the current path of the address transistor 14d, respectively. In the amplification transistor 14b which is connected in this manner, signals which are accumulated in the floating diffusion layer 13 are amplified, and are output to a noise removal circuit 17 from the vertical signal line VSL. In the noise removal circuit 17, noise is removed from a pixel signal, and is output to a signal line HSL. In addition, the other end of a current path of a load transistor 16 is connected to one end of a current path of the amplification transistor 14b. A gate of the load transistor 16 and one end of a current path are connected to a control signal line DC.

A gate of the readout transistor 14a is connected to the readout signal line TG. In addition, one end of the current path is connected to an anode of the photodiode 12, and the other end is connected to the floating diffusion layer 13, respectively. The readout transistor 14a which is connected in this manner controls the accumulation of charges in the photodiode 12.

In the reset transistor 14c, a gate is connected to a reset signal line RST, one end of a current path is connected to the floating diffusion layer 13, and the other end is connected to a power supply terminal 15. The reset transistor 14c which is connected in this manner has a function of resetting a gate potential of the amplification transistor 14b.

In the address transistor 14d, a gate is connected to an address signal line ADR, one end of a current path is connected to the other end of the current path of the amplification transistor 14b, and the other end is connected to the power supply terminal 15. The address transistor 14d which is configured in this manner selects the unit pixel 11 as an operation target (readout target) according to a pulse signal from the address signal line ADR.

In addition, one address signal line ADR, one reset signal line RST, and the number of readout signal lines TG corresponding to the number of types of the color pixel which is included in a row are provided in each of the rows of the unit pixel 11 arranged in the imaging region 3. In the example which is illustrated in FIG. 1, two types of color pixels of the G pixel and the R pixel are arranged on the first row from above. Accordingly, two readout signal lines TG11 and TG12 are provided on the first row from above. In addition, two types of color pixels of the B pixel and the G pixel are arranged on the second row from above. Accordingly, two readout signal lines TG21 and TG22 are provided on the second row from above. In addition, the same color pixels as the first row are arranged on an odd row, and the same color pixels as the second row are arranged on an even row. Accordingly, also in a configuration in each signal line, the odd row has the same configuration as the first row, and the even row has the same configuration as the second row.

The plurality of readout signal lines which are arranged in each row exhibit one-to-one correspondence with respect to a type of each color pixel. For example, in a case of the example which is illustrated in FIG. 1, a G pixel (G1 pixel) corresponds to the readout signal line TG11 on the first row, and an R pixel corresponds to the readout signal line TG12. Accordingly, as illustrated in FIG. 2, a gate of the readout transistor 14a of the G pixel which is arranged on the first row is connected to the readout signal line TG11, and a gate of the readout transistor 14a of the R pixel is connected to the readout signal line TG12.

Similarly, a B pixel corresponds to the readout signal line TG21 on the second row, and a G pixel (G2 pixel) corresponds to the readout signal line TG22. Accordingly, as illustrated in FIG. 2, a gate of the readout transistor 14a of the B pixel which is arranged on the second row is connected to the readout signal line TG21, and a gate of the readout transistor 14a of the G pixel is connected to the readout signal line TG22.

In this manner, since the readout transistor 14a of a different color pixel is connected to a different readout signal line, it is possible to set a different exposing timing (or exposure time) in each color pixel.

Figure 3:
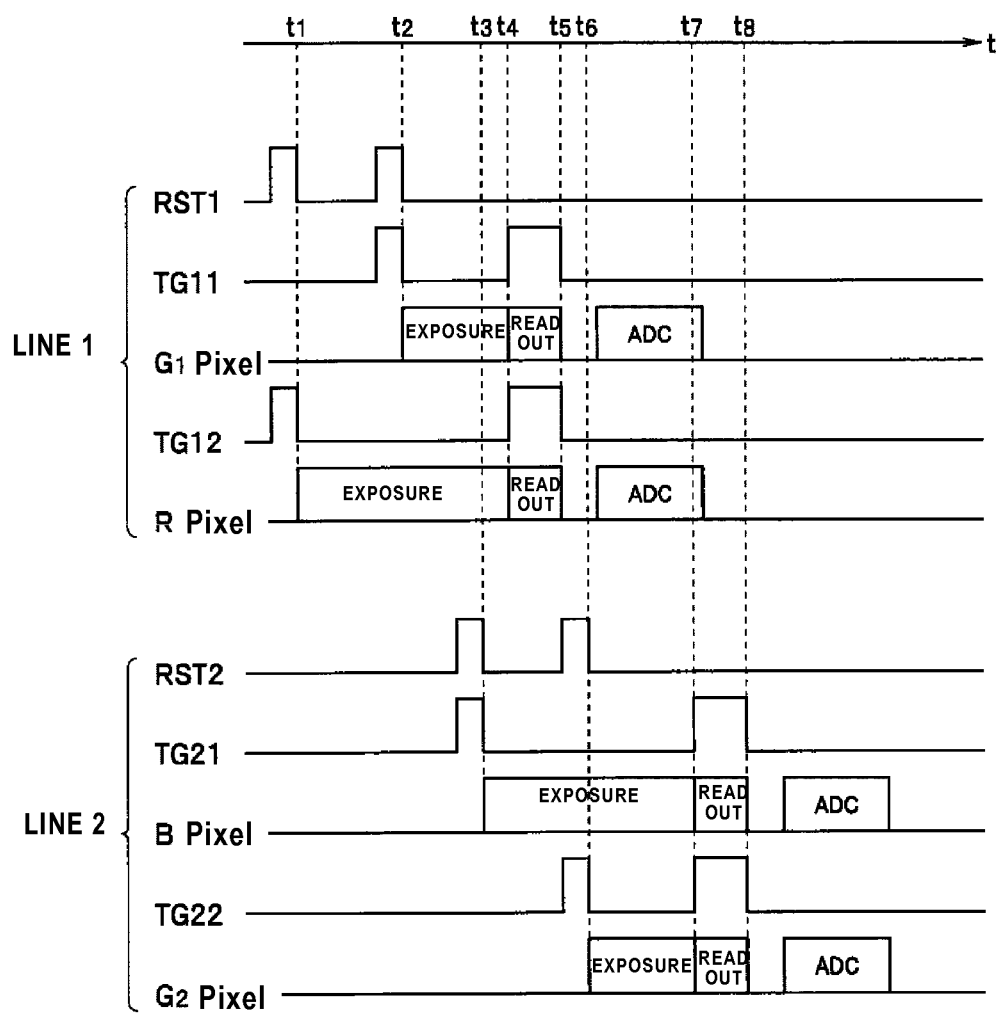
FIG. 3 is a flowchart which illustrates a timing chart for obtaining a pixel signal from a unit pixel according to an embodiment.

Subsequently, a readout operation of a pixel signal in the solid-state imaging device, which is configured as described above, will be described using a time chart in FIG. 3. FIG. 3 is a timing chart which describes a timing which obtains a pixel signal from the unit pixel 11.

First, the process of setting an exposure time in each color pixel will be described. An exposure time in each color pixel is set according to a sensitivity ratio of a color filter. For example, when a sensitivity ratio is R:G:B=1:2:1, it is possible to adjust the sensitivity ratio to R:G:B=1:1:1 by setting an exposure time of an R pixel, and a B pixel to be two times an exposure time of a G pixel. In the related art, the sensitivity ratio was adjusted by increasing pixel signals of the R pixel and the B pixel, which are obtained from a unit pixel using the same exposure time for each pixel, by two times using digital processing. However, by simply multiplying the pixel signals by two, a noise component, which is included in the pixel signal, also becomes two times larger. However, since the solid-state imaging device according to the embodiment adjusts a sensitivity ratio by increasing an exposure time by two times, an increase of the noise component may only become approximately 1.4 times. Accordingly, it is possible to suppress a deterioration in the SNR due to adjusting of the sensitivity ratio compared to a method in the related art.

The sensitivity ratio in each color pixel becomes different in each sensor chip. As noted above, the photoelectric conversion element in each pixel will have a different light receiving sensitivity (or light sensitivity) depending, at a minimum, on a property of the color filter used with the photoelectric conversion element. As noted above, in one example, the light receiving sensitivity of each of the pixels that use a red color filter might have different light sensitivity than the pixels the use a green or blue color filter. These differences in the light receiving sensitivities will cause the sensitivity ratios to vary when comparing a pixel that uses one type of color filter to a pixel that uses another type of color filter. Also, in some cases, pixels that contain the same color filter type (e.g., red, blue or green) may have a different light receiving sensitivity, due to variations in the properties of the color filters themselves. For this reason, a sensitivity ratio which is measured in a test before product shipment or the like is stored in the memory 6 in advance. In the above described example, 0.5 (=½) is stored in the memory for sensitivity ratio between R and G 61 of the memory 6, and 0.5 (=½) is stored in the memory for sensitivity ratio between B and G 62.

When imaging an image, the ALC 10 obtains a sensitivity ratio of each color pixel of R, G, and B from the memory 6, and calculates an exposure time in each color pixel. The calculated exposure time in each color pixel is sent to the unit of each register 71 to 74 of the exposure time control unit 7. In the above described example, when Td as an exposure time is sent to the G1 register 71 and the G2 register 74, Td×2 as an exposure time is sent to the R register 72 and the B register 73. The timing generator 8 refers to a set value of each of registers 71 to 74 of the exposure time control unit 7, generates a pulse timing of each signal for obtaining and reading out a pixel signal, and outputs the pulse timing to the vertical shift register 4. Hereinafter, a readout operation of a pixel signal will be described.

Pulse signals are output to a reset signal line RST1 and the readout signal line TG12 from the vertical shift register 4 (time t1). Due to these pulse signals, the reset transistor 14c and the readout transistor 14a of the R pixel become ON states. After that, due to the ON state of the readout transistor 14a, charges which are accumulated in the photodiode 12 are read out in the floating diffusion layer 13 through the readout transistor 14a, and the photodiode 12 is reset. In addition, due to the ON state of the reset transistor 14c, charges which are accumulated in the floating diffusion layer 13 are reset. Thereafter, the reset transistor 14c and the readout transistor 14a become OFF states, and accumulating of the charges to the photodiode 12 of the R pixel is started (starting exposure of R pixel).

Subsequently, at a time point when exposure of the R pixel is performed up to a half of an exposure time which is set in the R register 72 of the exposure time control unit 7, the pulse signals are output to the reset signal line RST1 and the readout signal line TG11 from the vertical shift register 4 (time t2). Due to these pulse signals, the reset transistor 14c and the readout transistor 14a of the G1 pixel become ON states. After that, due to the ON state of the readout transistor 14a, charges which are accumulated in the photodiode 12 are read out in the floating diffusion layer 13 through the readout transistor 14a, and the photodiode 12 is reset. In addition, due to the ON state of the reset transistor 14c, charges which are accumulated in the floating diffusion layer 13 are reset. Thereafter, the reset transistor 14c and the readout transistor 14a become OFF states, and accumulating of the charges to the photodiode 12 of the G1 pixel is started (starting exposure of G1 pixel).

When exposure of the R pixel and the G pixel is performed until an exposure time which is set in the corresponding register 71, and the register 72 of the exposure time control unit 7, readout pulses are input to the readout signal line TG11 and the readout signal line TG12 from the vertical shift register 4 (time t4). After that, the readout transistors 14a of the R pixel and the G1 pixel become ON states, and charges which are accumulated in the photodiode 12 of both the pixels are read out in the floating diffusion layers 13 of both pixels. A potential of the floating diffusion layer 13 is modulated according to a charge amount which is read out from the photodiode 12.

Subsequently, the vertical shift register 4 outputs a row selection pulse to an address signal line ADR1. Since the address transistor 14d in which the address signal line ADR1 is connected to a gate becomes an ON state, a current amount which flows to the amplification transistor 14b is modulated according to the charge amount which is accumulated in the floating diffusion layer 13, the current amount is read out in the vertical signal line VSL as a signal of each pixel, and is output to the AD conversion unit 5 as a pixel signal. Thereafter, the pixel signal is converted to a digital signal in the AD conversion unit 5, and the readout operation of the pixel signal on the first row is ended.

In addition, the pixel signal which is digitalized in the AD conversion unit 5 is output to the ALC 10 through the output interface 9. In the ALC 10, a sensitivity ratio of each color pixel of R, G, and B is calculated based on a level of the input pixel signal, and an exposure time in each color pixel is calculated. The calculated exposure time of each color pixel is fed back to the exposure time control unit 7, and a value of each of registers 71 to 74 is reset. In this manner, it is possible to flexibly change the sensitivity ratio of each color pixel when a tone of the overall color of an imaging target is changed (for example, when a state in which imaging is performed under natural light is switched to a state in which imaging is performed under a light source of a specific color such as red) by recalculating the sensitivity ratio from a level of a read out pixel signal, and sequentially adjusting an exposure time. These techniques can be used to improve and/or adjust the precision of a white balance.

As described above, exposure of the R pixel which is arranged on the first row is performed between the time t1 and t4. On the other hand, exposure of the G pixel which is arranged on the first row is performed between the time t2 and t4. In this manner, it is possible to adjust an exposure time to be different in each color pixel by performing a start of exposure at a different timing in each color pixel, though readout is performed at the same timing, with respect to the color pixels of a plurality of types which are arranged on the same row. It is possible to adjust a level of the output pixel signal to the same level by setting an exposure time corresponding to a sensitivity ratio in each color pixel, and to improve the white balance while suppressing the increase in the noise component.

In addition, in the readout operation of the above described pixel signal, for the color pixels with the same color which are arranged on the same row, the readout operation is performed at the same timing. That is, the readout operation is performed on the R pixel which is arranged on the first row at the same timing as the above described R pixel, and similarly, the readout operation is performed on the G pixel which is arranged on the first row at the same timing as the above described G pixel.

In addition, the readout operation of a pixel signal is performed in the middle of performing the readout operation in the previous row, or at a predetermined timing after completing the readout operation with respect to each row after the second row in the imaging region 3. For example, as illustrated in FIG. 3, pulse signals are output to a reset signal line RST2 and the readout signal line TG21 from the vertical shift register 4 while exposing of each unit pixel 11 on the first row is performed (time t3). Due to these pulse signals, the reset transistor 14c and the readout transistor 14a of the B pixel become ON states. After that, due to the ON state of the readout transistor 14a, the charges which are accumulated in the photodiode 12 are read out in the floating diffusion layer 13 through the readout transistor 14a, and the photodiode 12 is reset. In addition, due to the ON state of the reset transistor 14c, the charges which are accumulated in the floating diffusion layer 13 are reset. Thereafter, the reset transistor 14c and the readout transistor 14a become OFF states, and accumulating of charges in the photodiode 12 of the B pixel is started (starting exposure of B pixel).

Subsequently, the reset signal line RST2 and the readout signal line TG22 are output from the vertical shift register 4 at a time point when exposure of the B pixel is performed until half of a time of the exposure time which is set in the B register 72 of the exposure time control unit 7 (time t6). Due to these pulse signals, the reset transistor 14c and the readout transistor 14a of the G2 pixel become ON states. After that, due to the ON state of the readout transistor 14a, charges which are accumulated in the photodiode 12 are read out in the floating diffusion layer 13 through the readout transistor 14a, and the photodiode 12 is reset. In addition, due to the ON state of the reset transistor 14c, charges which are accumulated in the floating diffusion layer 13 are reset. Thereafter, the reset transistor 14c and the readout transistor 14a become OFF states, and accumulating of charges in the photodiode 12 of the G2 pixel is started (starting exposure of G2 pixel).

When exposures of the B pixel and the G pixel are performed until an exposure time which is set in the corresponding register 73, and the register 74 of the exposure time control unit 7, readout pulses are input to the readout signal line TG21 and the readout signal line TG22 from the vertical shift register 4 (time t7). After that, the readout transistors 14a of the B pixel and the G2 pixel become ON states, and charges which are accumulated in the photodiodes 12 of both pixels are read out in the floating diffusion layers 13 of both the pixels. A potential of the floating diffusion layer 13 is modulated according to the charge amount which is read out from the photodiode 12.

Subsequently, a row selection pulse is output to an address signal line ADR2 from the vertical shift register 4. Since the address transistor 14d in which the address signal line ADR2 is connected to a gate becomes an ON state, a current amount which flows to the amplification transistor 14b is modulated by the charge amount which is accumulated in the floating diffusion layer 13, the current amount is read out in the vertical signal line VSL as a signal of each pixel, and is output to the AD conversion unit 5 as a pixel signal. Thereafter, the pixel signal is converted to a digital signal in the AD conversion unit 5, and the readout operation of the pixel signal on the second row is ended.

As described above, according to the embodiment, the readout signal lines TG11 and TG12 in the number of types of the color pixel which is included in each of the rows are provided in each row of the unit pixel 11 which is arranged in the imaging region 3, and are connected to the readout transistor 14a so as to exhibit one-to-one correspondence with respect to the types of the color pixels. It is possible to adjust the exposure time in each color pixel by delaying the readout timing of the respective readout signal lines TG11 and TG12, and making the exposing start time different. It is possible to adjust a level of the output pixel signal to the same level by setting the exposure time corresponding to the sensitivity ratio in each color pixel, and to suppress the increase in the noise component when adjusting the white balance.

In addition, in the above described example, the exposure time is adjusted in each color pixel by setting the exposing end timing of the R pixel and G pixel, and the B pixel and G pixel which are arranged on the same row to be the same, and delaying the exposing start timing thereof. However, the exposure time may be adjusted by delaying the exposing end timing by setting the exposing start timing to be the same, or delaying both the exposing start timing and the exposing end timing.

In addition, the color filter which is arranged in the unit pixel 11 is not limited to the Bayer arrangement, and may have another arrangement, for example, by arranging a W (white) pixel without arranging a color filter in the G2 pixel on the second row. In particular, when the W pixel is arranged in the unit pixel 11, since a level of a pixel signal of the W pixel is much greater than those of other color pixels, the W pixel becomes saturated when exposing is performed for the same time as other color pixels. However, according to the solid-state imaging device in the embodiment, since different exposure times can be set according to a sensitivity ratio of a color pixel, it is possible to shorten exposure time of the W pixel compared to other color pixels, and to perform exposing at a level which is appropriate to other color pixels while avoiding saturation of the W pixel.

In addition, in the above described example, since it is assumed that the image sensor unit 1 and the ISP unit 2 are formed as separate chips, the exposure time control unit 7 (registers 71 to 74) for storing exposure time of each color pixel is provided in the image sensor unit 1, however, it may be a configuration in which the image sensor unit 1 and the ISP unit 2 are formed in the same chip, and exposure time of each color pixel which is calculated in the ALC 10 is directly input to the timing generator 8. In this case, since the registers 71 to 74 of the exposure time control unit 7 are not necessary, further miniaturization of the device can be realized. In addition, when the image sensor unit 1 and the ISP unit 2 are formed as separate chips, the image sensor unit and the ISP unit may be made as one package by lamination thereof.

Each "unit" in the present specification is a conceptual unit corresponding to each function of the embodiment, and does not necessarily exhibit one-to-one correspondence with specific hardware, or a software routine. Accordingly, in the present specification, the embodiment was described by assuming a virtual circuit block (unit) having each function of the embodiment.

While certain embodiments of the invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device, comprising: an imaging unit comprising a plurality of pixels that are arranged in a two-dimensional matrix pattern, and each pixel in the plurality of pixels comprises a color filter and a photoelectric conversion element, wherein the photoelectric conversion element is configured to receive light passing through the color filter, and has a light receiving sensitivity that is derived from a property of the color filter;
a memory which is configured to store a ratio of a first light receiving sensitivity to a second light receiving sensitivity;
a register that is configured to store an exposure time for each pixel of the plurality of pixels, wherein the exposure time for each pixel is derived from the light receiving sensitivity assigned to the pixel; and
an auto luminous control unit that is configured to calculate the exposure time for at least one of the pixels in the plurality of pixels based on the ratio stored in the memory;
wherein the plurality of color filters includes a white color filter and another color filter selected from a group consisting of a red color filter, a blue color filter and a green color filter, and
wherein the exposure time of any pixel that includes a white color filter is shorter than any pixel that includes a red color filter, a blue color filter or green color filter.

2. The solid-state imaging device of claim 1, wherein the property of the color filter is a color of the light that the color filter is configured to transmit.

3. The solid-state imaging device of claim 1, wherein the two-dimensional matrix pattern comprises a plurality of rows of pixels, and the solid-state imaging device further comprises:
a plurality of readout signal lines that are associated with each of the rows of pixels, wherein a number of readout signal lines associated with each of the rows of pixels is equal to a number of different types of color filters in a row of pixels.

4. The solid-state imaging device of claim 3, wherein each readout signal line is coupled to two or more pixels, and the each readout signal line is configured to receive charge that is accumulated by the photoelectric conversion element of the two or more pixels.

5. A solid-state imaging device, comprising:
an imaging unit comprising a plurality of pixels that are arranged in a two-dimensional matrix pattern comprising a plurality of rows, and each pixel comprises a color filter and a photoelectric conversion element, wherein the photoelectric conversion element is configured to receive light passing through the color filter and has a light receiving sensitivity that is derived from a property of the color filter;
a plurality of readout signal lines for each of the rows of pixels, wherein a number of readout signal lines for each of the rows of pixels is equal to a number of different types of color filters in the each of the row of pixels; and
an auto luminous control unit that is configured to calculate an exposure time for at least one of the pixels in the plurality of pixels based on a ratio of the light receiving sensitivity of a first pixel in the plurality of pixels to the light sensitivity of a second pixel in the plurality of pixels.

6. The solid-state imaging device of claim 5, further comprising:
a register that is configured to store exposure times for each of the plurality of pixels, wherein the exposure time for each pixel is derived from the light receiving sensitivity of the pixel.

7. The solid-state imaging device of claim 6, wherein a signal which controls a start timing and an end timing of an exposure for each of the plurality of pixels is output to the plurality of readout signal lines.

8. The solid-state imaging device of claim 6, wherein an exposure time, stored in the register, of a first pixel in the plurality of pixels that has a color filter that transmits a first color is shorter than an exposure time, stored in the register, of a second pixel in the plurality of pixels that has a color filter that transmits a second color that is different from the first color.

9. The solid-state imaging device of claim 5, further comprising:
a memory configured to store the ratio of the light receiving sensitivity of the first pixel and the light receiving sensitivity of the second pixel, wherein the property of the color filter in the first pixel and the property of the color filter in the second pixel are different.

10. The solid-state imaging device of claim 9, wherein the property of the color filter is a color of the light that the color filter is configured to transmit.

11. A method of using a solid-state imaging device that comprises a plurality of pixels that are arranged in a two-dimensional matrix pattern, comprising:
retrieving a first light sensitivity ratio for a first plurality of pixels in the plurality of pixels and a second light sensitivity ratio of a second plurality of pixels in the plurality of pixels, each of the first and second light sensitivity ratios being stored in a memory;
calculating an exposure time for each of the plurality of pixels based on retrieved first and second light sensitivity ratios which have been retrieved from the memory, wherein the exposure time for the first plurality of pixels is calculated based on the first light sensitivity ratio and the exposure time for the second plurality of pixels is calculated based on the second light sensitivity ratio;
after exposing each of the plurality of pixels for the respectively calculated exposure time, sensing an amount of accumulated charge in a photoelectric conversion element disposed in each of plurality of pixels.

12. The method of claim 11, wherein
the first light sensitivity ratio comprises a ratio of a light receiving sensitivity of a first photoelectric conversion element that is derived from a property of a first color filter and a light receiving sensitivity of a second photoelectric conversion element that is derived from a property of a second color filter, and
the second sensitivity ratio comprises a ratio of a light receiving sensitivity of a third photoelectric conversion element that is derived from a property of a third color filter and a light receiving sensitivity of a fourth photoelectric conversion element that is derived from a property of a fourth color filter.

13. The method of claim 11, wherein each of the plurality of pixels further comprise a color filter and a photoelectric conversion element that is configured to receive light passing through the color filter, and
the first light sensitivity ratio that is stored in the memory is derived from a property of the color filter in each pixel.

14. The method of claim 13, wherein the plurality of color filters comprise includes a white color filter and another color filter selected from a group consisting of a red color filter, a blue color filter and a green color filter.

15. The method of claim 11, wherein
each pixel of the plurality of pixels comprises a color filter that is one of a white color filter and another color filter selected from a group consisting of a red color filter, a blue color filter and a green color filter, and
the exposure time calculated for each pixel of the plurality of pixels that comprises the white color filter is smaller than the exposure time calculated for each pixel of the plurality of pixels that comprises the color filter.

* * * * *